United States Patent
Korenshtein

(10) Patent No.: US 8,296,374 B2
(45) Date of Patent: Oct. 23, 2012

(54) CONTROLLING THE PRESENCE INFORMATION OF ACTIVITY PARTICIPANTS

(75) Inventor: Roni Korenshtein, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 1026 days.

(21) Appl. No.: 12/260,214

(22) Filed: Oct. 29, 2008

(65) Prior Publication Data

US 2010/0114958 A1    May 6, 2010

(51) Int. Cl.
*G06F 15/16* (2006.01)
(52) U.S. Cl. ....................................... 709/206
(58) Field of Classification Search .......... 709/204–206, 709/224–227; 715/753
See application file for complete search history.

(56) References Cited

U.S. PATENT DOCUMENTS

| | | | |
|---|---|---|---|
| 7,571,228 B2 * | 8/2009 | Classen et al. ............... | 709/224 |
| 7,617,280 B1 * | 11/2009 | Webster et al. ............... | 709/204 |
| 7,701,882 B2 * | 4/2010 | Jones et al. ................... | 370/260 |
| 7,752,268 B2 * | 7/2010 | Shah ............................. | 709/206 |
| 7,792,913 B2 * | 9/2010 | Chen ............................ | 709/206 |
| 7,945,619 B1 * | 5/2011 | Chawla et al. ................ | 709/204 |
| 2006/0031779 A1 * | 2/2006 | Theurer et al. ............... | 715/781 |
| 2007/0055669 A1 | 3/2007 | Murillo et al. | |

FOREIGN PATENT DOCUMENTS

EP    1801743    6/2007

OTHER PUBLICATIONS http://www.symbianguru.com/auto-profiles-2-0-for-series-60-v3-profile-scheduler-including-a-bluetooth-scheduler.html.

* cited by examiner

*Primary Examiner* — Chirag R Patel
(74) *Attorney, Agent, or Firm* — Suzanne Frez; Ryan, Mason & Lewis, LLP

(57) ABSTRACT

Techniques for relaying presence information of one or more entities, wherein the one or more entities are participants in a scheduled activity, are provided. A status of the scheduled activity is obtained from a first entity via an application loaded on a device of the first entity. The presence information of the first entity and/or a second entity is updated in accordance with the status of the scheduled activity. The updated presence information of the first entity and/or the second entity is published.

2 Claims, 2 Drawing Sheets

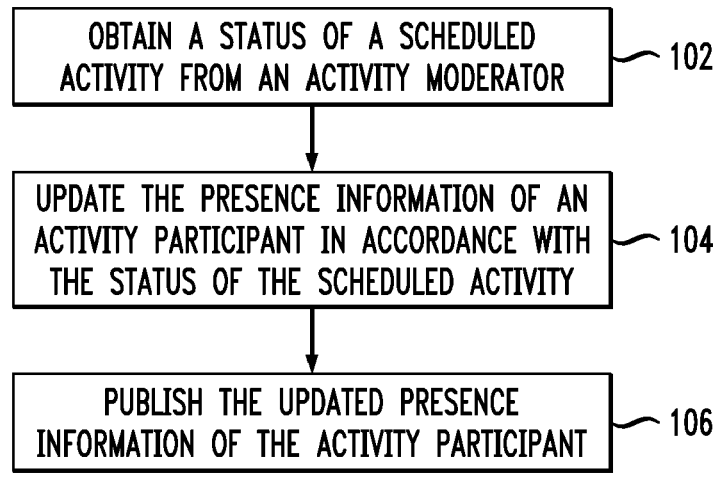
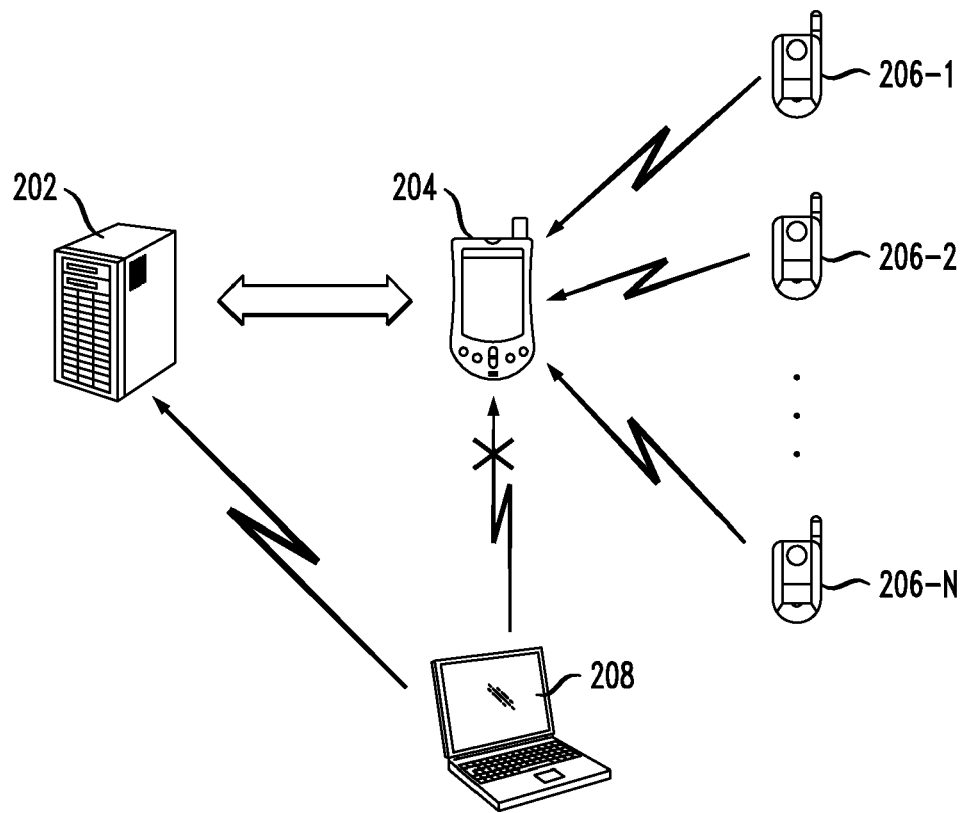

400

CONTROLLING THE PRESENCE INFORMATION OF ACTIVITY PARTICIPANTS

FIELD OF THE INVENTION

The present invention relates generally to presence information and, particularly, to techniques for controlling the presence status of an entity.

BACKGROUND OF THE INVENTION

Presence information is very helpful in determining the availability of a person. For example, presence information is commonly used in internet messaging. If a person is available to communicate via the internet, a status reflecting an availability to communicate is published to other internet users. In the alternative, if the person is unavailable to communicate, an unavailability status is published. In more complex scenarios, presence information may be used to reflect the availability of a person at anytime and anywhere. For instance, presence information may be used concurrently with personal applications, such as personal calendars and/or schedulers. If a person is at a scheduled activity, such as a meeting, the presence information of the person may be automatically set to show that the person is unavailable to communicate. After the scheduled activity has ended, the presence information may automatically switch to an available status.

In a perfect world, the schedule of a person reflects when the person is or is not available; however, in reality, the schedule of a person is rarely a true representation of a person's availability. For example, scheduled activities do not always begin and end on time. Furthermore, the schedule of a person does not account for breaks in a scheduled activity and/or when the person decides to temporarily or permanently leave the scheduled activity. These periods of time at which a person is not present at a scheduled activity may be important windows of opportunity to communicate with the person. For example, an individual may want to contact the person with an important message via voice, video, and/or text. At the same time, the individual may not want to interrupt the person during an important scheduled activity (e.g., a high-level meeting, a funeral, etc.). Conventional techniques do not address periods of availability which may occur during scheduled activities.

SUMMARY OF THE INVENTION

Principles of the present invention provide techniques that overcome the above-mentioned drawbacks associated with existing methods by providing techniques that address the above needs, as well as other needs. Particularly, principles of the invention provide techniques for relaying presence information of an entity during a scheduled activity.

For example, in one embodiment of the invention, a technique for relaying presence information of one or more entities, wherein the one or more entities are participants in a scheduled activity, is provided. A status of the scheduled activity is obtained from a first entity via an application loaded on a device of the first entity. The presence information of the first entity and/or a second entity is updated in accordance with the status of the scheduled activity. The updated presence information of the first entity and/or the second entity is published.

In another embodiment, a presence of the second entity at the scheduled activity may be detected and/or an absence of the second entity from the scheduled activity may be detected by determining a presence of a wireless device of the second entity via the device of the first entity. The wireless device of the second entity may be associated with the second entity. Further, the presence information of the second entity may be updated in accordance with the presence of the second entity at the scheduled activity and/or the absence of the second entity from the scheduled activity.

In additional embodiments, the above technique for relaying presence information of one or more entities, wherein the one or more entities are participants in a scheduled activity, may be carried out by an apparatus and/or a computer program product.

These and other objects, features, and advantages of the present invention will become apparent from the following detailed description of illustrative embodiments thereof, which is to be read in connection with the accompanying drawings.

BRIEF DESCRIPTION OF THE DRAWINGS

FIG. 1 is a flow diagram illustrating an exemplary methodology for relaying presence information of one or more entities, wherein the one or more entities are participants in a scheduled activity, according to an embodiment of the present invention.

FIG. 2 is a diagram illustrating an exemplary interaction between a device of an activity moderator, devices of one or more activity participants, and a server carrying out the methodology of FIG. 1, according to an embodiment of the present invention.

DETAILED DESCRIPTION OF PREFERRED EMBODIMENTS

Figure 3:
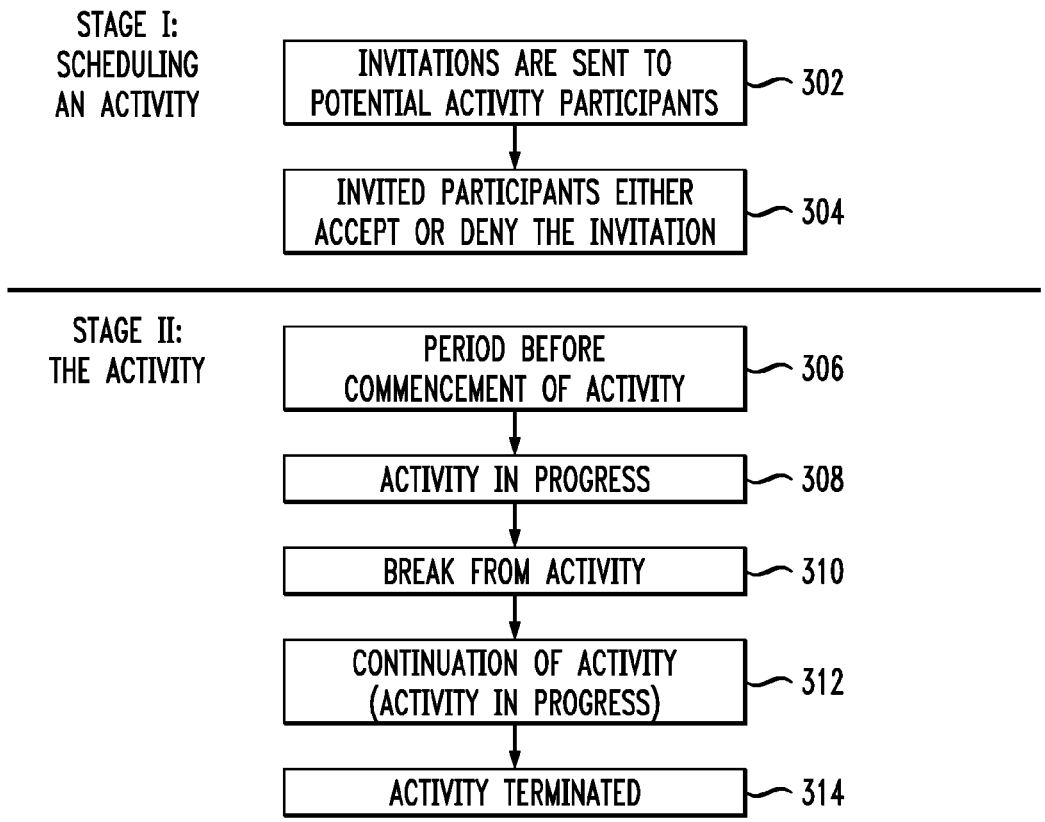
FIG. 3 is a flow diagram illustrating an exemplary scenario in which the proposed techniques may be implemented, according to an embodiment of the present invention.

The present invention will be described in conjunction with exemplary methods for relaying presence information of one or more entities, wherein the one or more entities are participants in a scheduled activity. Specifically, the present disclosure will illustrate controlling the published presence information of one or more participants of a scheduled activity, such as a meeting. It should be understood, however, that the invention is not limited to the particular embodiments described herein and modifications to the illustrative embodiments will become apparent to those skilled in the art given the teachings described herein.

The term "presence information" as used herein is intended to be construed broadly so as to encompass, by way of example and without limitation, any information related to the status of an entity. In one example, presence information may reflect the availability or unavailability of a person to communicate with another via a communications medium (i.e., voice, video, text, etc.). Presence information may also specify a level of availability or unavailability (e.g., temporarily available, temporarily unavailable, etc.) and/or customized presence statuses to be published to one or more particular parties.

Conventional techniques do not accurately reflect the actual availability of a participant at a scheduled activity. For example, an unavailable status may be published for a person to a presence server when the person is scheduled to participate in an activity (e.g., a meeting) and an available status may be published at the end of the scheduled activity. However, current techniques do not account for any changes in a person's availability during the scheduled activity. For instance, the meeting may start late or the meeting may continue beyond the scheduled time period. Further, the meeting may have adjourned for a break or a participant may have left the scheduled activity and is therefore available to be contacted. The proposed techniques may be used to accurately update the presence information of one or more activity participants during a scheduled activity.

Referring initially to FIG. 1, a flow diagram illustrates an exemplary methodology for relaying presence information of one or more entities, wherein the one or more entities are participants in a scheduled activity, according to an embodiment of the present invention. Methodology 100 may be carried out by a computer-based device such as a server (e.g., central server). At step 102, a status of the scheduled activity is obtained from a first entity (e.g., an activity moderator). In an exemplary embodiment, the activity moderator is present at the scheduled activity and is equipped with a computer-based device (e.g., moderator device), such as a personal digital assistant (PDA), cell phone, personal computer (PC), or laptop. A moderator application may be loaded onto the moderator device, which allows the moderator device to interface with the central server. The moderator, using the moderator device, may provide real-time status information of the scheduled activity to the central server. For instance, the moderator may notify the server that the scheduled activity has started. Further, the moderator may notify the server when the scheduled activity is on break, returned from break, or has ended.

In accordance with the status of the scheduled activity, the presence information of an activity participant (e.g., a second entity) may be updated (step 104). In a preferred embodiment, the presence information of an activity moderator (e.g., a first entity) may also be updated in accordance with the status of the scheduled activity because the activity moderator may be considered a participant of the scheduled activity (i.e., activity participant). When the scheduled activity has not yet started, is on break, or has ended, the central server may consider the scheduled activity as inactive. During these times, there is no possibility of interruption to the scheduled activity, and therefore, the presence information for each activity participant will reflect a status as if each participant were not at the scheduled activity. For instance, a participant's presence information may reflect a default availability that is used when the participant is available to communicate (e.g., "available to talk," "available to chat," etc.). The default availability may be defined by a participant prior to the scheduled activity. In an exemplary embodiment, the central server may select a default availability setting for an activity participant when the scheduled activity is not active.

In the alternative, if the scheduled activity is in progress (e.g., active), the central server may update the presence information of an activity participant to reflect that the participant is unavailable to communicate because any communication with the activity participant may disrupt both the participant and the scheduled activity. In one embodiment, the central server may select a default unavailability setting for an activity participant when the scheduled activity is active and communication with the activity participant would interrupt the scheduled activity. Similar to the default availability setting described above, the default unavailability setting may be defined by a participant prior to the scheduled activity.

In a preferred embodiment, the presence information of an activity participant may also be updated in accordance with whether the activity participant is physically present at or physically absent from the scheduled activity. If a participant is physically present at the scheduled activity and the scheduled activity is active, the central server may update the presence information of the participant using the default unavailability setting described above. In the alternative, if a participant is physically absent from a scheduled activity that is in progress (e.g., the participant physically leaves the room or area where the scheduled activity is taking place to take a break) the central server may update the presence information of the participant using the default availability setting described above. Techniques for detecting physical presence of a participant at a scheduled activity will be described in greater detail below with reference to FIG. 2.

At step 106, the updated presence information for each activity participant, which may include a second entity and/or an activity moderator, is published. In an exemplary embodiment, the proposed central server carrying out methodology 100 interfaces with conventional presence systems to publish the updated presence information. For instance, a presence system, such as an instant messaging network, may receive the updated presence information of an activity participant who is also a member of its instant messaging network and notify subscribers that are interested in the presence information of the activity participant. As a result, interested subscribers of the instant messaging network will be able to see the activity participant's real-time presence information. Furthermore, a call routing system may reroute communications directed to an activity participant that is unavailable to communicate to secondary locations (e.g., voicemail, a secondary phone line, an operator or secretary, etc.). If a communication is rerouted, the central server may generate a missed communications report and forward the report to the activity participant when the activity participant becomes available.

Referring now to FIG. 2, a diagram illustrates an exemplary interaction between a device of an activity moderator 204, devices of one or more activity participants, 206-1, . . . , 206-N, and a central server 202 carrying out the methodology of FIG. 1, according to an embodiment of the present invention. In an exemplary embodiment, an activity moderator (e.g., a first entity) is assigned to moderate a scheduled activity. It is to be appreciated that there may be multiple activity moderators. Furthermore, activity moderators may be changed at anytime before or during the scheduled activity by one or more authorized entities. A moderator via a moderator device 204 may supply information about a scheduled activity to the central server 202. Information about the scheduled activity may comprise a status of the scheduled activity (e.g., active or inactive) and an indication of physical presence or absence for one or more activity participants (e.g., second entities) at the scheduled activity. This information may be used by the central server 202 to update the presence information of activity participants.

In an exemplary embodiment, moderator device 204 may be any computer-based device, such as a cell phone, a PDA, PC, or laptop. A moderator application (i.e., software) may be loaded on to the moderator device 204, which allows the moderator device 204 to interface with the central server 202. The moderator application may be automatically downloaded from the central server 202. In an illustrative embodiment, the communications between the central server 202 and the moderator device 204 may be encrypted for security purposes. Furthermore, the central server 202 may verify the authenticity of information from the moderator device 204 by verifying the device's identification information, which may be provided by the activity moderator to the central server 202 prior to the scheduled activity.

The moderator application may also provide a user interface to the moderator. The user interface may comprise activity organization options and basic moderator controls. The activity organization options may comprise a menu for selecting scheduled activities according to date, time, topic, location, and an activity identification number, which may be assigned by the central server 202 when a scheduled activity is first scheduled. The proposed moderator controls may comprise basic moderator commands. For example, the interface may be configured to provide four basic options: (1) start; (2) pause; (3) resume; and (4) end. Depending on the status of the scheduled activity (e.g., active or inactive), the central server 202 may logically update the presence information of activity participants (e.g., one or more second entities and/or activity moderators) accordingly.

The start option may be used to signal that the scheduled activity has begun. The start option may be useful because scheduled activities may not begin on time. In one embodiment, prior to commencement of a scheduled activity, activity participants may be subject to pre-defined default availability settings (e.g., "available" presence information) because they are most likely available to receive communications and are able to communicate with others without interruption to the scheduled activity. Once the activity has started, pre-defined default unavailability settings (e.g., "unavailable" presence information) may be published for some activity participants, which reflect that the activity participants are unavailable.

After the activity has started, the moderator may use the pause option to signify a break in the scheduled activity. During a break period, "available" presence information may be set for activity participants because the break period may provide activity participants another opportunity to receive communications and communicate with anyone without interruption to the scheduled activity. The moderator may reinitiate the scheduled activity by using the resume option. When the resume option is utilized, the scheduled activity is once again active and "unavailable" presence information may be set for some activity participants. The end option may be used to terminate the scheduled activity. The end option may be useful because scheduled activities may end early or continue beyond the scheduled time period.

In an exemplary embodiment, each of the four basic options is available to the moderator only when relevant. For example, before a scheduled activity has started, the only option available to the moderator may be the start option because the pause, resume, and end options are not applicable. After the scheduled activity has started, the only options available may be pause and end. If the pause option is used, the resume option becomes available because an activity on break may only be resumed or ended. If the resume option is used, again, only the pause and end options may be available. When the scheduled activity is terminated with the end option, the moderator may be redirected to the activity organization options, which allow for initiation or organization of another scheduled activity.

In addition to communicating the status of the scheduled activity as entered by the moderator via the software running on the moderator device 204, the software running on the moderator device 204 (e.g., moderator application) may track the physical presence of one or more activity participants at the scheduled activity. In a preferred embodiment, the software running on the moderator device 204 may detect the presence or absence of a wireless device (206-1, ..., 206-N) of an activity participant during a scheduled activity. In one embodiment, devices 206-1, ..., 206-N each emit unique wireless signals, via Bluetooth®, Radio-Frequency Identification (RFID), Near Field Communication (NFC), etc. Each unique wireless signal is detected by moderator device 204 and forwarded to the central server 202. If a wireless signal matches an identification of a wireless device of a participant, the central server 202 may make the assumption that the participant is physically present at the scheduled activity (e.g., an active participant). In the alternative, failure to detect a wireless device of a participant at the scheduled activity carries the assumption that the participant is not physically present at the scheduled activity (e.g., an inactive participant). It should be noted that wireless device information may be registered with the central server 202 by the participant prior to the scheduled activity, which will be described below with reference to FIG. 3. The detected presence or absence of a participant at a scheduled activity may be used in combination with the status of the scheduled activity by the central server 202 to update the presence information of the participant.

In a preferred embodiment, the moderator device 204 may detect the presence of wireless devices 206-1, ..., 206-N in accordance with the status of the scheduled activity. For example, if the scheduled activity is inactive (e.g., pending, on break, or terminated), the moderator device 204 may not scan for wireless devices because there is no possibility of interruptions to the scheduled activity. Further, when the scheduled activity is inactive, the central server 202 may consider all participants as "inactive" and set their presence information accordingly, for instance, the central server 202 may set the presence information for each "inactive" participant to his/her default availability setting.

In the alternative, if the scheduled activity is active (e.g., in progress), the moderator device 204 may continuously scan for wireless devices within its immediate area (e.g., a conference room where the scheduled activity is taking place). Each wireless signal detected by the moderator device 204 may be forwarded to the central server 202 for processing. The central server 202 may first determine if the wireless signal belongs to a participant of the scheduled activity. If the signal belongs to a participant, the participant may be marked as "active" and the central server 202 may set the participant's presence information accordingly. For instance, the central server 202 may set the presence information of an "active" participant to his/her default unavailability setting. However, if a participant leaves the scheduled activity, a failure to detect the device of the participant will be reported to or detected by the central server 202. The central server 202 may then consider the participant "inactive" and may set the presence information of the participant to his/her default availability setting because the participant is assumed to have left the scheduled activity and is therefore available to communicate with others without interruption to the scheduled activity. It should be appreciated that activity participants may enter and exit an area of the scheduled activity at various times during the scheduled activity. The moderator device 204 may detect and report these changes to the central server 202. In response, the central server 202 may update the presence information of the participants accordingly.

The determination of presence or absence of a participant at a scheduled activity may be carried out in two ways. In one embodiment, the moderator device 204 compares a latest scan of detected participant devices to a previous scan of detected participant devices to determine which participants have entered and exited the area of the scheduled activity. The moderator device 204 may then generate a list of newly detected devices and a list of devices that are no longer being detected. The two lists may be uploaded to the central server 202 and the central server 202 may update the presence information of the activity participants accordingly. In a preferred embodiment, the moderator device 204 does not upload any information to the central server 202 if there are no changes in detected devices between scan iterations. This reduces communications traffic between the moderator device 204 and the central server 202, and reduces processing strain on the central server 202. In a second embodiment, the moderator device 204 does not perform the logic of generating two lists as described above. Instead, the moderator device 204 simply communicates any detected devices to the central server 202 after every scan. The central server 202 then compares newly detected devices with previously detected devices and generates a list of newly detected devices and a list of devices that are no longer being detected. It should be noted that in this second embodiment, the moderator device 204 communicates with the central server 202 after every scan, even if there are no changes in detected devices between scan iterations.

The moderator device 204 senses the presence or absence of activity participants by employing scanning techniques of short range communication technologies such as Bluetooth®, RFID, NFC, etc. during a scheduled activity; however, some participants may be equipped with a wireless device that is not capable of short range communication. In this case, moderator device 204 can not detect the physical presence of the participant. In an illustrative embodiment, a participant with a device incapable of short range communication 208 may communicate directly with central server 202 to report his/her physical presence anytime the participant enters or exits a scheduled activity that is in session. In one exemplary embodiment, the participant with a wireless device incapable of short range communication 208 may send a request to central server 202 using the internet (via the cellular network or Wi-Fi) to report his/her own physical presence. Therefore, if the participant wants to leave the scheduled activity to take a break, the participant may send a request indicating his/her absence via the wireless device incapable of short range communication 208. In this example, the central server 202 may accept the request and consider the participant "inactive." As a result, the central server 202 may publish the participant's default "available" presence information. When the participant returns to the scheduled activity, the participant may send another internet request via the device 208 to notify the central server 202 that he/she has returned. In response, the central server 202 may consider the participant "active" and may update the participant's presence information using his/her default unavailability setting.

As illustrated above, the central server 202 may update the presence information of an activity participant with one or more default status settings depending on: (1) a status of the scheduled activity (e.g., active or inactive); and (2) a physical presence of the activity participant at the scheduled activity (e.g., present or absent). A default status setting may be defined by an activity participant prior to a scheduled activity. In an exemplary embodiment, a participant may define two default settings: default availability and default unavailability. The default availability setting may be automatically published when a scheduled activity is not in progress (e.g., inactive) and/or when the participant is inactive (e.g., either his/her physical presence is not detected or he/she indicated a physical absence via the internet). In the alternative, the default unavailability setting may be automatically published when the participant is active (e.g., either physically present at the scheduled activity that is in progress or the participant indicated his/her physical presence via an internet request to the server as described above).

The default availability and default unavailability settings of a participant may be automatically applied during any scheduled activity in which he/she is a participant. However, the participant may customize his/her presence information for a particular scheduled activity. In this instance, the participant may define an overriding availability setting and an overriding unavailability setting to be used during the particular scheduled activity. For example, a participant may be expecting a communication during a scheduled meeting and would like "available" presence information to be published (e.g., overriding availability) or the participant may want "unavailable" presence information to be published when the scheduled meeting is on break because the participant may be too busy to communicate (e.g., overriding unavailability).

Referring now to FIG. 3, a flow diagram illustrates an exemplary scenario in which the proposed techniques may be implemented, according to an embodiment of the present invention. The scenario of FIG. 3 is separated into two stages: (I) Scheduling an Activity; and (II) The Activity.

Stage I occurs before a scheduled activity takes place. In an exemplary embodiment, an entity arranges a scheduled activity using a conventional calendar program that may be customized to interface with the central server 202 of FIG. 2. The entity may specify a time, date, location, and topic of the scheduled activity. Further, the entity may designate one or more activity moderators to oversee the scheduled activity. Concurrently, the central server may assign a unique activity identification number to the scheduled activity, which may be used to keep track of the scheduled activity and any moderator and participant information related to the scheduled activity. It should be appreciated that a moderator may be considered both a moderator and a participant of a scheduled activity. Moderator information may include moderator names and moderator device information, and participant information may include participant names, wireless device information, default presence settings, and physical presence information (e.g., tracking a participant's presence or absence at a scheduled activity).

At block 302, the entity via the calendar program sends invitations for the scheduled activity to potential participants. At block 304, the invited participants may either accept or deny the invitation. If a participant denies the invitation, the participant will not be included in the scheduled activity. If a participant accepts the invitation, the participant is listed by the central server as a participating member of the scheduled activity and is associated with the assigned activity identification number. In addition to accepting the invitation, the participant may also: (1) authorize moderator control over the presence information of the participant during the scheduled activity; (2) register wireless device information (e.g., Bluetooth® identification) for presence detection; and (3) define default presence settings (e.g., default availability, default unavailability, overriding availability, and overriding unavailability).

It should be noted that if a participant denies moderator control, the participant's presence information will not be updated by the central server in accordance with a status of the scheduled activity and/or a detected physical presence of the participant at the scheduled activity. Further, if an accepting participant does not provide wireless device identification information, a blank device field may be initialized by the central server. A participant that does not have wireless device identification information may be required to manually send physical presence updates/requests to the central server during the scheduled activity as described above with reference to FIG. 2, 208. It should be appreciated that the presence information of participants who agree to moderator control but do not supply wireless device identification information will still have their presence information updated. However, the presence information of these participants will only be updated in accordance with the status of the scheduled activity (e.g., active or inactive), rather than in accordance with both the status of the scheduled activity and physical presence or absence of the participants from the scheduled activity.

After the activity is scheduled and prior to the time of the activity, the central server may remind the moderator and all activity participants about the scheduled activity. Further, the central server may remind those participants who have authorized moderator control that their presence information will be altered during the scheduled activity.

Stage II illustrates an exemplary application of the proposed invention during a scheduled activity. In an exemplary embodiment, an assigned moderator utilizes the moderator application loaded on to his/her wireless device (e.g., moderator device) to prepare for the scheduled activity. The assigned moderator may select a scheduled activity from one or more scheduled activities by date, time, topic, location, and/or activity identification number. After selecting and initializing a scheduled activity, the moderator device may provide a start option to the moderator.

Block 306 represents the period before commencement of the scheduled activity. It should be appreciated that the period before a scheduled activity is a time at which activity participants may be available to communicate because the scheduled activity has not yet started; therefore, the central server may consider all activity participants "inactive" and may set the presence information for each activity participant to default availability settings.

After the moderator activates the start option, the scheduled activity officially begins (block 308). Once the scheduled activity is in progress, the moderator device begins scanning for wireless devices. In one embodiment, any detected wireless device signal is forwarded to the central server. The central server then tracks which activity participants are present at the scheduled activity and which participants are absent from the scheduled activity. In this embodiment, the moderator device continuously detects wireless devices while the scheduled activity is in progress. After each detection cycle, the central server tracks the comings and goings of activity participants. The central server then updates the presence information for each activity participant accordingly. This may involve setting the presence information of present participants to a default unavailability setting and absent participants to a default availability setting. An overriding default setting (e.g., overriding availability setting and/or overriding unavailability setting) may also be utilized if pre-specified by a participant. Anytime a participant's presence information is updated, the central server may notify the participant of the update via the participant's wireless device. It should be noted that if an activity participant does not have a wireless device that can be detected by the moderator device, the presence information of that participant is still controlled, but only in accordance with the status of the scheduled activity. At the same time, the participant may manually send physical presence updates/requests (e.g., information regarding physical presence or absence from the scheduled activity) to the central server as described above with reference to FIG. 2, 208.

During block 308, the moderator device may provide a pause option and an end option to the moderator. The moderator may initiate a break in the scheduled activity by activating the pause option (block 310). At this time, the moderator device may display a resume option and an end option to the activity moderator. Furthermore, because the scheduled activity is no longer active, the moderator device may discontinue wireless device detection. Concurrently, the central server may consider all participants "inactive" and may use default availability settings to update the presence information of each participant.

If the moderator activates the resume option, the scheduled activity is once again in progress (block 312). The moderator device may once again provide a pause option and an end option to the moderator. Further, the moderator device will recommence wireless device detection and the central server will track participant presence as described above with reference to block 308.

The moderator may end the scheduled activity by activating the end option. After the scheduled activity is terminated (block 314) and no longer in progress, the central server may use default availability settings to update the presence information of each activity participant.

Figure 4:
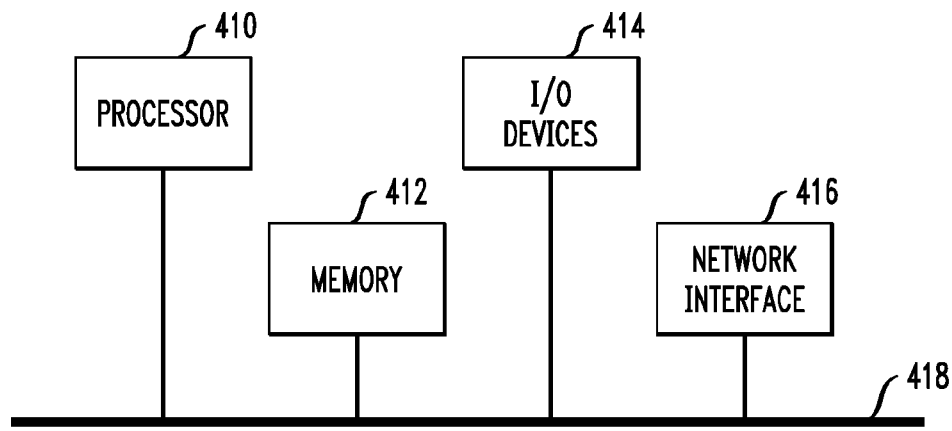
FIG. 4 is a diagram illustrating an illustrative hardware implementation of a computing system in accordance with which one or more components/methodologies of the present invention may be implemented, according to an embodiment of the present invention.

Referring now to FIG. 4, block diagram 400 illustrates an exemplary hardware implementation of a computing system in accordance with which one or more components/methodologies of the invention (e.g., components/methodologies described in the context of FIGS. 1-3) may be implemented, according to an embodiment of the present invention.

As shown, the techniques for relaying presence information of one or more entities, wherein the one or more entities are participants in a scheduled activity, may be implemented in accordance with a processor 410, a memory 412, I/O devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer-readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Still further, the phrase "network interface" as used herein is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, or a magnetic storage device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Further, the present invention was described above with reference to diagrams of methods, apparatus (systems), and computer program products according to embodiments of the invention. It will be understood that individual functions/acts in the diagrams, and combinations of functions/acts in the diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the diagrams.

These computer program instructions may also be stored in a computer-readable medium that may direct a computer or other programmable data processing apparatus to function in a particular manner, such that the instructions stored in the computer-readable medium produce an article of manufacture including instruction means which implement the functions/acts specified in the diagrams.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the diagrams.

The diagrams illustrate the architecture, functionality, and operation of possible implementations of systems, methods, and computer program products according to various embodiments of the present invention. In this regard, individual functions/acts in the diagrams may represent a module, segment, or portion of code, which comprises one or more executable instructions for implementing the specified logical function(s). It should also be noted that, in some alternative implementations, the functions/acts in the diagrams may occur out of the order noted in the diagrams. For example, two steps shown in succession may, in fact, be executed substantially concurrently, or the steps may sometimes be executed in the reverse order, depending upon the functionality involved. It will also be noted that individual functions/acts in the diagrams, and combinations of functions/acts in the diagrams, may be implemented by special purpose hardware-based systems that perform the specified functions or acts, or combinations of special purpose hardware and computer instructions.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for relaying presence information of one or more entities, wherein the one or more entities are participants in a scheduled activity, the method comprising a computer performing the steps of:
   obtaining a status of the scheduled activity from a first entity via an application loaded on a device of the first entity;
   updating the presence information of at least one of the first entity and a second entity in accordance with the status of the scheduled activity; and
   publishing the updated presence information of at least one of the first entity and the second entity;
   wherein the presence information of the second entity is updated using one or more default settings set by the second entity, wherein one of the one or more default settings is selected in accordance with at least one of the obtained status of the scheduled activity and a presence status of the second entity at the scheduled activity;
   wherein the one or more default settings is at least one of a default availability, a default unavailability, an overriding availability, and an overriding unavailability, such that the overriding availability is selected over the default availability and the overriding unavailability is selected over the default unavailability.

2. An apparatus for relaying presence information of one or more entities, wherein the one or more entities are participants in a scheduled activity, the apparatus comprising:
   a memory; and
   at least one processor coupled to the memory and operative to: obtain a status of the scheduled activity from a first entity via an application loaded on a device of the first entity; update the presence information of at least one of the first entity and a second entity in accordance with the status of the scheduled activity; and publish the updated presence information of the at least one of first entity and the second entity;
   wherein the presence information of the second entity is updated using one or more default settings set by the second entity, wherein one of the one or more default settings is selected in accordance with at least one of the obtained status of the scheduled activity and a presence status of the second entity at the scheduled activity;
   wherein the one or more default settings is at least one of a default availability, a default unavailability, an overriding availability, and an overriding unavailability, such that the overriding availability is selected over the default availability and the overriding unavailability is selected over the default unavailability.

* * * * *